(12) United States Patent
Jeddeloh (10) Patent No.: US 8,448,018 B2
(45) Date of Patent: *May 21, 2013

(54) STRIPE-BASED MEMORY OPERATION

(75) Inventor: Joseph M. Jeddeloh, Shoreview, MN (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/605,124

(22) Filed: Sep. 6, 2012

(65) Prior Publication Data

US 2012/0331253 A1    Dec. 27, 2012

Related U.S. Application Data

(63) Continuation of application No. 12/569,412, filed on Sep. 29, 2009, now Pat. No. 8,266,501.

(51) Int. Cl.
*G06F 11/16* (2006.01)

(52) U.S. Cl.
USPC .......... 714/6.22; 714/4.11; 714/6.2; 714/770; 714/773; 714/769; 711/102; 711/114

(58) Field of Classification Search
None
See application file for complete search history.

(56) References Cited

U.S. PATENT DOCUMENTS

| | | | | |
|---|---|---|---|---|
| 5,537,534 | A * | 7/1996 | Voigt et al. | 714/6.21 |
| 6,745,284 | B1 * | 6/2004 | Lee et al. | 711/114 |
| 7,523,257 | B2 * | 4/2009 | Horn et al. | 711/114 |
| 2002/0069317 | A1 * | 6/2002 | Chow et al. | 711/104 |
| 2002/0161972 | A1 * | 10/2002 | Talagala et al. | 711/114 |
| 2003/0120863 | A1 | 6/2003 | Lee et al. | |
| 2004/0225926 | A1 | 11/2004 | Scales et al. | |
| 2005/0050383 | A1 | 3/2005 | Horn et al. | |
| 2005/0149678 | A1 * | 7/2005 | Stolowitz | 711/114 |
| 2006/0156059 | A1 | 7/2006 | Kitamura | |
| 2008/0250270 | A1 * | 10/2008 | Bennett | 714/6 |
| 2008/0320214 | A1 * | 12/2008 | Ma et al. | 711/103 |
| 2009/0132755 | A1 | 5/2009 | Radke | |
| 2011/0126045 | A1 * | 5/2011 | Bennett | 714/6.22 |
| 2011/0231600 | A1 * | 9/2011 | Tanaka et al. | 711/103 |

FOREIGN PATENT DOCUMENTS

WO    2008121306 A2    10/2008

OTHER PUBLICATIONS

International Search Report and Written Opinion for related PCT Application PCT/US2010/002556, mailed May 19, 2011 (9 pages).

* cited by examiner

*Primary Examiner* — John Trimmings
(74) *Attorney, Agent, or Firm* — Brooks, Cameron & Huebsch, PLLC (57) ABSTRACT

The present disclosure includes methods and devices for stripe-based memory operation. One method embodiment includes writing data in a first stripe across a storage volume of a plurality of memory devices. A portion of the first stripe is updated by writing updated data in a portion of a second stripe across the storage volume of the plurality of memory devices. The portion of the first stripe is invalidated. The invalid portion of the first stripe and a remainder of the first stripe are maintained until the first stripe is reclaimed. Other methods and devices are also disclosed.

20 Claims, 5 Drawing Sheets

STRIPE-BASED MEMORY OPERATION

PRIORITY APPLICATION INFORMATION

This application is a Continuation of U.S. application Ser. No. 12/569,412 filed Sep. 29, 2009, to be issued as U.S. Pat. No. 8,266,501, which is incorporated herein by reference.

TECHNICAL FIELD

The present disclosure relates generally to semiconductor memory devices, methods, and systems, and more particularly, to stripe-based memory operation.

BACKGROUND

Memory devices are typically provided as internal, semiconductor, integrated circuits in computers or other electronic devices. There are many different types of memory including volatile and non-volatile memory. Volatile memory can require power to maintain its data and includes random-access memory (RAM), dynamic random access memory (DRAM), and synchronous dynamic random access memory (SDRAM), among others. Non-volatile memory can provide persistent data by retaining stored information when not powered and can include NAND flash memory, NOR flash memory, read only memory (ROM), Electrically Erasable Programmable ROM (EEPROM), Erasable Programmable ROM (EPROM), and phase change random access memory (PCRAM), among others.

Memory devices can be combined together to form a solid state drive (SSD). A solid state drive can include non-volatile memory, e.g., NAND flash memory and NOR flash memory, and/or can include volatile memory, e.g., DRAM and SRAM, among various other types of non-volatile and volatile memory. Flash memory devices, including floating gate flash devices and charge trap flash (CTF) devices using semiconductor-oxide-nitride-oxide-semiconductor and metal-oxide-nitride-oxide-semiconductor capacitor structures that store information in charge traps in the nitride layer, may be utilized as non-volatile memory for a wide range of electronic applications. Flash memory devices typically use a one-transistor memory cell that allows for high memory densities, high reliability, and low power consumption.

An SSD can be used to replace hard disk drives as the main storage device for a computer, as the solid state drive can have advantages over hard drives in terms of performance, size, weight, ruggedness, operating temperature range, and power consumption. For example, SSDs can have superior performance when compared to magnetic disk drives due to their lack of moving parts, which may avoid seek time, latency, and other electro-mechanical delays associated with magnetic disk drives. SSD manufacturers can use non-volatile flash memory to create flash SSDs that may not use an internal battery supply, thus allowing the drive to be more versatile and compact.

An SSD can include a number of memory devices, e.g., a number of memory chips (as used herein, "a number of" something can refer to one or more of such things, e.g., a number of memory devices can refer to one or more memory devices). As one of ordinary skill in the art will appreciate, a memory chip can include a number of dies and/or logical units (LUNs). Each die can include a number of memory arrays and peripheral circuitry thereon. The memory arrays can include a number of memory cells organized into a number of physical pages, and the physical pages can be organized into a number of blocks.

A redundant array of independent disks (RAID) is an umbrella term for computer data storage schemes that divide and/or replicate data among multiple memory devices. The multiple memory devices in a RAID array may appear to a user and the operating system of a computer as a single memory device, e.g., disk. Historically, a RAID operated with multiple hard disk drives (HDDs).

DETAILED DESCRIPTION

The present disclosure includes methods and devices for stripe-based memory operation. One method embodiment includes writing data in a first stripe across a storage volume of a plurality of memory devices. A portion of the first stripe is updated by writing updated data in a portion of a second stripe across the storage volume of the plurality of memory devices. The portion of the first stripe is invalidated. The invalid portion of the first stripe and a remainder of the first stripe are maintained until the first stripe is reclaimed.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure. As used herein, the designators "N," "M," "P," "R," and "S," particularly with respect to reference numerals in the drawings, indicates that a number of the particular feature so designated can be included with one or more embodiments of the present disclosure.

The figures herein follow a numbering convention in which the first digit or digits correspond to the drawing figure number and the remaining digits identify an element or component in the drawing. Similar elements or components between different figures may be identified by the use of similar digits. For example, 108 may reference element "08" in FIG. 1, and a similar element may be referenced as 208 in FIG. 2. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate the embodiments of the present invention, and should not be taken in a limiting sense.

Figure 1:
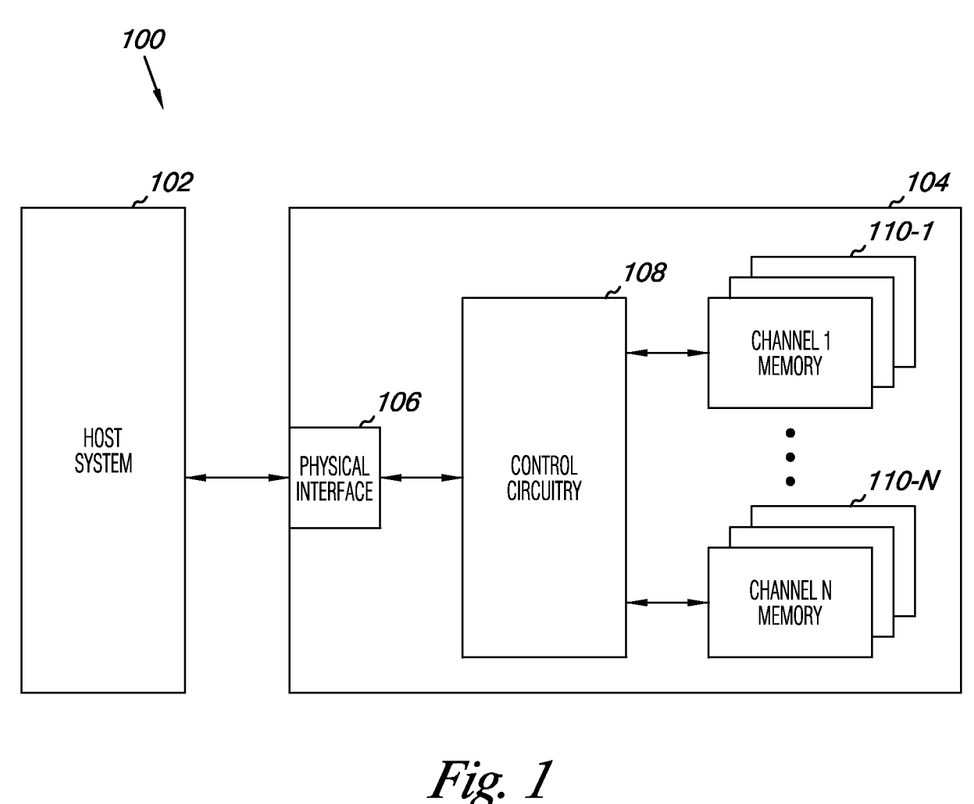
FIG. 1 is a functional block diagram of a computing system including at least one memory system, in accordance with one or more embodiments of the present disclosure.

FIG. 1 is a functional block diagram of a computing system 100 including at least one memory system 104, in accordance with one or more embodiments of the present disclosure. In the embodiment illustrated in FIG. 1, the memory system 104, e.g., a solid state drive (SSD), can include a physical host interface 106, memory system control circuitry 108, e.g., an SSD controller, and one or more solid state memory devices 110-1, . . . , 110-N. The solid state memory devices 110-1, . . . , 110-N can provide a storage volume for the memory system, e.g., with a file system formatted to the memory devices. In one or more embodiments, the memory system control circuitry 108 can be an application specific integrated circuit (ASIC) coupled to a printed circuit board including the physical interface 106 and solid state memory devices 110-1, . . . , 110-N.

As illustrated in FIG. 1, the memory system control circuitry 108 can be coupled to the physical host interface 106 and to the solid state memory devices 110-1, . . . , 110-N. The physical host interface 106 can be used to communicate information between the memory system 104 and another device such as a host system 102. Host system 102 can include a memory access device, e.g., a processor. One of ordinary skill in the art will appreciate that "a processor" can intend one or more processors, such as a parallel processing system, a number of coprocessors, etc. Examples of host systems include laptop computers, personal computers, digital cameras, digital recording and playback devices, mobile telephones, PDAs, memory card readers, interface hubs, and the like. For one or more embodiments, the physical host interface 106 can be in the form of a standardized interface. For example, when the memory system 104 is used for data storage in a computing system 100, the physical host interface 106 can be a serial advanced technology attachment (SATA), peripheral component interconnect express (PCIe), or a universal serial bus (USB), among other connectors and interfaces. In general, however, physical host interface 106 can provide an interface for passing control, address, data, and other signals between the memory system 104 and a host system 102 having compatible receptors for the physical host interface 106.

The memory system control circuitry 108 can communicate with the solid state memory devices 110-1, . . . , 110-N to read, write, and erase data, among other operations. Memory system control circuitry 108 can have circuitry that may be one or more integrated circuits and/or discrete components. For one or more embodiments, the circuitry in memory system control circuitry 108 may include control circuitry for controlling access across the solid state memory devices 110-1, . . . 110-N and circuitry for providing a translation layer between a host system 102 and the memory system 104. Thus, a memory controller could selectively couple an I/O connection (not shown in FIG. 1) of a solid state memory device 110-1, . . . 110-N to receive the appropriate signal at the appropriate I/O connection at the appropriate time. Similarly, the communication protocol between a host system 102 and the memory system 104 may be different than what is required for access of a solid state memory device 110-1, . . . , 110-N. Memory system control circuitry 108 could then translate the commands received from a host into the appropriate commands to achieve the desired access to a solid state memory device 110-1, . . . , 110-N.

A solid state memory device 110-1, . . . , 110-N can include one or more arrays of memory cells, e.g., non-volatile memory cells. The arrays can be flash arrays with a NAND architecture, for example. In a NAND architecture, the control gates of memory cells of a "row" can be coupled with an access, e.g., word, line, while the memory cells can be coupled in series source to drain in a "string" between a select gate source transistor and a select gate drain transistor. The string can be connected to a data, e.g., bit, line by the select gate drain transistor. The use of the terms "row" and "string" implies neither a linear nor an orthogonal arrangement of memory cells. As will be appreciated by those of ordinary skill in the art, the manner of connection of the memory cells to the bit lines and source lines depends on whether the array is a NAND architecture, a NOR architecture, or some other memory array architecture.

The solid state memory devices 110-1, . . . , 110-N can include a number of memory cells that can be grouped. As used herein, a group can include one or more memory cells, such as a page, block, plane, die, an entire array, or other groups of memory cells. For example, some memory arrays can include a number of pages of memory cells that make up a block of memory cells. A number of blocks can be included in a plane of memory cells. A number of planes of memory cells can be included one a die. As an example, a 128 GB memory device can include 4314 bytes of data per page, 128 pages per block, 2048 blocks per plane, and 16 planes per device.

The memory system 104 can implement wear leveling to control the wear rate on the solid state memory devices 110-1, . . . , 110-N. A solid state memory array can experience errors, e.g., failures, after a number of program and/or erase cycles. Wear leveling can reduce the number of program and/or erase cycles performed on a particular group. Wear leveling can include dynamic wear leveling to minimize the amount of valid blocks moved to reclaim a block. Dynamic wear leveling can include a technique called garbage collection. Garbage collection can include reclaiming, e.g., erasing and making available for writing, blocks that have the most invalid pages, e.g., according to a "greedy algorithm." Alternatively, garbage collection can include reclaiming blocks with more than a threshold amount of invalid pages. If sufficient free blocks exist for a writing operation, then a garbage collection operation may not occur. An invalid page, for example, can be a page of data that has been updated to a different page. Static wear leveling includes writing static data to blocks that have high erase counts to prolong the life of the block. One or more embodiments of the present disclosure can perform wear leveling, e.g., garbage collection and/or reclamation, on a stripe-basis rather than on a block-basis. According to one or more embodiments of the present disclosure, a reclamation process can be initiated in response to less than a threshold number of free blocks being available.

Write amplification is a process that may occur when writing data to solid state memory devices 110-1, . . . , 110-N. When randomly writing data in a memory array, control circuitry scans for free space in the array. Free space in a memory array can be individual cells, pages, and/or blocks of memory cells that are not storing data and/or have been erased. If there is enough free space to write the data in a selected location, then the data is written to the selected location of the memory array. If there is not enough free space in the selected location, the data in the memory array is rearranged by reading, copying, moving, or otherwise rewriting and erasing the data that is already present in the selected location to a new location, leaving free space for the new data that is to be written in the selected location. The rearranging of old data in the memory array is called write amplification because the amount of writing performed by the memory device is amplified over an amount of writing that would occur if there were sufficient free space in the selected location. One or more stripe-based memory operation embodiments of the present disclosure can be used to reduce write amplification as described herein.

The embodiment of FIG. 1 can include additional circuitry that is not illustrated so as not to obscure embodiments of the present disclosure. For example, the memory system 104 can include address circuitry to latch address signals provided over I/O connections through I/O circuitry. Address signals can be received and decoded by a row decoder and a column decoder to access the solid state memory devices 110-1, ..., 110-N. It will be appreciated by those skilled in the art that the number of address input connections can depend on the density and architecture of the solid state memory devices 110-1, ..., 110-N.

Figure 2:
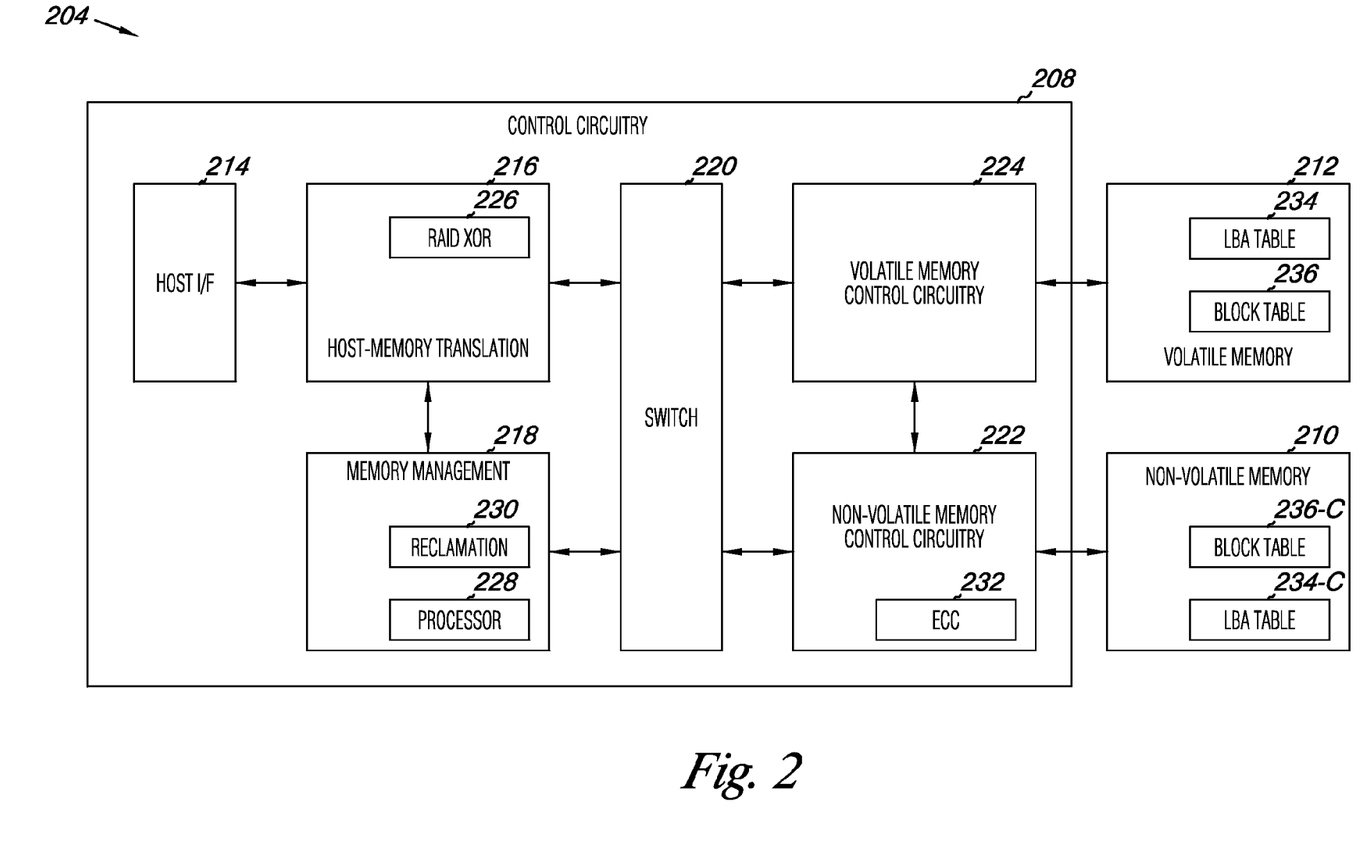
FIG. 2 is a functional block diagram of a memory system in accordance with one or more embodiments of the present disclosure.

FIG. 2 is a functional block diagram of a memory system 204 in accordance with one or more embodiments of the present disclosure. The memory system 204 can include memory system control circuitry 208. The memory system control circuitry 208 can be coupled to one or more solid state memory devices, e.g., non-volatile memory 210 and/or volatile memory 212. Memory system 204 and memory system control circuitry 208 can be analogous to memory system 104 and memory system control circuitry 108 respectively, illustrated in FIG. 1.

The memory system control circuitry 208 can include host interface circuitry 214, host-memory translation circuitry 216, memory management circuitry 218, a switch 220, non-volatile memory control circuitry 222, and/or volatile memory control circuitry 224. As described herein, the memory system control circuitry 208 can be provided in the form of an ASIC, however, embodiments are not so limited.

The host interface circuitry 214 can be coupled to host-memory translation circuitry 216. The host interface circuitry 214 can be coupled to and/or incorporated with a physical interface to a host system, such as physical interface 106 illustrated in FIG. 1. The host interface circuitry 214 can interface with a host system, e.g., host system 102 in FIG. 1, through a number of layers including a physical layer, a link layer, and/or a transport layer. One of ordinary skill in the art will appreciate that the number of layers for a particular host interface can be defined by an interface standard such as serial advanced technology attachment (SATA), peripheral component interconnect express (PCIe), universal serial bus (USB), etc. As used herein, a transport layer can indicate at least a transport layer as part of a SATA standard and/or a transaction layer as part of a PCIe standard. One of ordinary skill in the art will appreciate that a transport layer according to a SATA standard can be analogous to a transaction layer according to a PCIe standard. The host interface circuitry 214 can include an advanced host controller interface (AHCI) compatible host bus adapter (HBA).

In general, the host interface circuitry 214 is responsible for converting command packets received from the host system, e.g., from a PCIe bus, into command instructions for the host-memory translation circuitry 216 and for converting host-memory translation responses into host system commands for transmission to the requesting host. For example, the host interface circuitry 214 can construct SATA command packets from PCIe based transaction layer packets. The host interface circuitry 214 can be configured to receive data associated with a plurality of addresses from a host system. The host interface circuitry 214 can receive updated data associated with one or more of the plurality of addresses.

The host-memory translation circuitry 216 can be coupled to the host interface circuitry 214, to the memory management circuitry 218, and/or to the switch 220. The host-memory translation circuitry 216 can be configured to translate host addresses to memory addresses, e.g., addresses associated with a received command such as a read and/or write command. The host-memory translation circuitry 216 might, for example, convert host sector read and write operations to commands directed to specific portions of the non-volatile memory 210. Each host operation can be translated into single or multi-sector non-volatile memory 210 operation. For example, host read and write commands can be translated into non-volatile memory 210 read and write commands. The host-memory translation circuitry 216 can include second level error detection/correction circuitry, such as RAID exclusive or (XOR) circuitry 226. The RAID XOR circuitry 226 can calculate parity data based on data received from the host interface circuitry 214.

According to one or more embodiments of the present disclosure, write data can be striped across multiple solid state memory devices in a RAID operation. As one of ordinary skill in the art will appreciate, striping includes splitting data so that it is stored on more that one device. The portions of the more than one device that store the split data are collectively referred to as a stripe. In contrast, mirroring can include storing duplicate copies of data on more than one device. Striping is described in more detail in connection with FIG. 4. As an example, write data can be striped across seven of eight memory devices, where parity data can be stored in an eighth memory device, e.g., memory system 204 can include multiple non-volatile memory devices 210, each coupled to the memory system control circuitry 208 by a separate channel. For each bit written to the seven of eight memory devices, a parity bit can be calculated by the RAID XOR circuitry 226 and written to the eighth memory device, e.g., bit 0 from each of the seven memory devices can be used to generate bit 0 in the parity (eighth) memory device.

The memory management circuitry 218 can be coupled to the host-memory translation circuitry 216 and to the switch 220. The memory management circuitry 218 can control a number of processes including but not limited to initialization, wear leveling, e.g., garbage collection and/or block reclamation, and/or error detection/correction, e.g., via operation of processor 228. Memory management circuitry 218 can access a block table, e.g., block table 236, to determine candidates for wear leveling, e.g., garbage collection. The memory management circuitry 218 can be configured to provide indications in a block table, e.g., block table 236, as to whether a portion of a stripe, e.g., one or more blocks, is valid or invalid. The memory management circuitry 218 can update an LBA table, e.g., LBA table 234, with a new physical address corresponding to a logical address when data associated with the logical address is updated. With respect to stripe-based operation, memory management circuitry 218 can be configured to effectively remove a portion of a particular stripe from the particular stripe in response to a detected error associated with the portion of the particular stripe.

The memory management circuitry 218 can, e.g., as part of a wear leveling operation, search for blocks that have a high erase count in a block table, e.g., block table 236. The memory management circuitry can compare the erase count of a particular block with a threshold count. For example, the erase count of the block with the lowest erase count can be subtracted from the particular block. If the difference is greater than the threshold count, then the particular block can be indicated as a candidate for block reclamation.

The memory management circuitry 218 can, e.g., as part of a dynamic wear leveling operation, search for blocks that have a garbage collection threshold amount of invalid, e.g., unused, portions, e.g., pages, therein. After searching the block table, e.g., block table 236, the memory management circuitry 218 can indicate the stripes that have blocks with the most invalid pages as candidates for a stripe-based reclamation process. The memory management circuitry 218 can include reclamation circuitry 230. Reclamation is a process that can be invoked by memory management circuitry 218 as part of wear leveling. Reclamation involves moving all valid pages from a block to be erased to new locations before the block is erased.

The switch 220 can be coupled to the host-memory translation circuitry 216, the memory management circuitry 218, the non-volatile control circuitry 222, and/or the volatile memory control circuitry 224. The switch 220 can be a crossbar switch and can include and/or be coupled to one or more buffers, e.g., static random access memory (SRAM) buffers. The switch 220 can provide an interface between various components of the memory system control circuitry 208. The switch 220 can account for variations in defined signaling protocols that may be associated with different components of the memory system control circuitry 208 in order to provide consistent access and implementation between components. In one or more embodiments, the switch 220 can be a direct memory access (DMA) module.

The non-volatile memory control circuitry 222, e.g., controller, can be coupled to the switch 220 and to one or more non-volatile memory devices 210. Among other information, the one or more non-volatile memory devices 210 can store a copy of a logical block address (LBA) table 234-C and/or a block table 236-C, as described herein. In some embodiments, the memory system control circuitry 208 can include one non-volatile memory controller for all memory channels. In one or more other embodiments, each memory channel is coupled to a discrete non-volatile memory controller.

One or more embodiments including discrete non-volatile memory controllers for each channel can include discrete first level error detection/correction circuitry 232 coupled to each controller and/or one or more first level error detection/correction circuits 232 that can be used with more than one channel. The first level error detection/correction circuitry 232 can be configured to apply error correction such as BCH error correction, as will be understood by one of ordinary skill in the art, to detect and/or correct errors associated with data stored in the non-volatile memory 210. For example, the first level error detection/correction circuitry can provide 29 bits of error correction over a 1080-bit code word. The first level error detection/correction circuitry 232 can be configured to provide differing error correction schemes for single and/or multi level cell (SLC/MLC) operation. The first level error detection/correction circuitry 232 can detect errors that are not correctable by the first level error detection/correction, e.g., UECC errors, such as by determining that there are more than a threshold amount of correctable errors. As described in more detail below in connection with FIG. 4, one or more embodiments of the present disclosure provide for correction of UECC errors. For example, a portion of a stripe with a UECC error or other error can be effectively removed from the stripe and the non-volatile memory control circuitry 222 can be configured to operate the stripe without the removed portion.

The non-volatile memory control circuitry 222 can be configured to write data in a first stripe across a number of memory channels as described herein. The non-volatile memory control circuitry 222 can be configured to write updated data in a second stripe across the number of memory channels without reading or copying the data in the first stripe. In one or more embodiments, the non-volatile memory control circuitry 222 can be configured to read portions of a stripe on a page-basis without reading a remainder of the stripe. The non-volatile memory control circuitry 222 can be configured to operate a number of non-volatile memory devices associated with the number of memory channels as a RAID. At least one of the number of memory channels can be operated as a parity channel and accordingly, one or more memory devices associated with the at least one of the number of memory channels can be operated as a parity memory device(s). Additional detail on stripe-based memory operation is provided in conjunction with the discussion of FIG. 4 below and throughout the present disclosure.

The volatile memory control circuitry 224 can be coupled to the switch 220 and to one or more volatile memory devices 212. Among other information, the one or more volatile memory devices can store an LBA table 234 and/or a block table 236. The LBA table 234 can store the physical page address of pages in the one or more non-volatile memory devices 210 and include corresponding logical addresses. The LBA table 234 can be indexed by the LBA that is contained in an associated SATA command. The LBA table 234 can be used to look-up physical page addresses that correspond to logical block addresses where corresponding information can be stored. The block table 236 can store information for erasable blocks in the one or more non-volatile memory devices 210. Information stored in the block table 236 can include valid page information, erase count, and other status information. Information accessed from the block table 236 can be indexed by physical block address.

Figure 3:
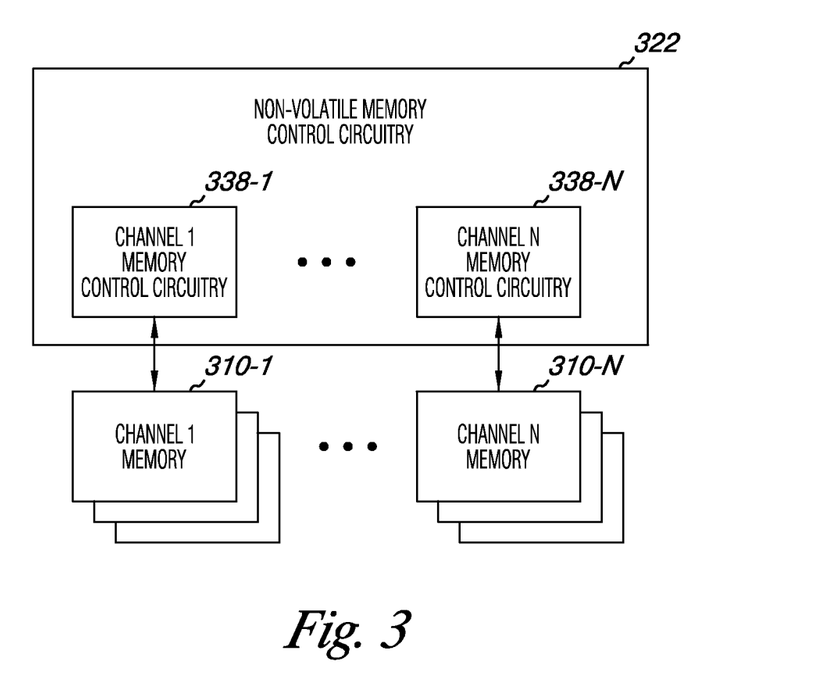
FIG. 3 is a functional block diagram of non-volatile memory control circuitry in accordance with one or more embodiments of the present disclosure.

FIG. 3 is a functional block diagram of non-volatile memory control circuitry 322 in accordance with one or more embodiments of the present disclosure. The non-volatile memory control circuitry 322 can be analogous to the non-volatile memory control circuitry 222 illustrated in FIG. 2. The non-volatile memory control circuitry 322 can be coupled to one or more solid state memory devices 310-1, . . . , 310-N. In one or more embodiments, each solid state memory device 310-1, . . . , 310-N can be coupled to the non-volatile memory control circuitry 322 by a separate channel. Each channel can be associated with discrete channel memory control circuitry 338-1, . . . , 338-N. However, embodiments are not so limited, as fewer, e.g., one, non-volatile memory control circuit 322 can provide control to a plurality of channels in one or more embodiments. Non-volatile memory control circuitry can perform a number of operations on the one or more solid state memory devices 310-1, . . . , 310-N including page read, stripe write, and stripe erase.

A page read operation can allow access to a page of memory. A page read command can be sent, e.g., queued, to a particular channel memory controller 338-1, . . . , 338-N and executed on the one or more solid state memory devices 310-1, . . . , 310-N. For example, a page read operation can support 4 kilobyte (KB), 8 KB, or another volume of data, depending upon page size, plus meta-data. Data from a page read operation can be transferred, e.g., in a DMA operation, by the channel memory controller 338-1, . . . , 338-N from the page in the solid state memory device 310-1, . . . , 310-N to a read buffer. Device status can be provided upon completion of the operation on the memory channel.

A stripe write operation can include a plurality of page write operations, e.g., one page write operation per each channel associated with the non-volatile memory control circuitry 322. In one or more embodiments, the plurality of page write operations in the stripe write operation can be performed substantially simultaneously across the plurality of channels. A page write operation can allow access to a page of memory. A page write command can be sent, e.g., queued, to the desired channel memory controller 338-1, . . . , 338-N and executed on the one or more solid state memory devices 310-1, . . . , 310-N. For example, a page write operation can support 4 kilobyte (KB), 8 KB, or another volume of data, depending upon solid state memory device 310-1, ..., 310-N page size, plus meta-data. Data from a page write operation can be transferred from a write buffer to the page in the solid state memory device 310-1, ..., 310-N by the channel memory controller 338-1, ..., 338-N. Write data for a stripe write operation can be received from a host system, e.g., host system 102 in FIG. 1.

Write data can be striped across a storage volume of a plurality of solid state memory devices 310-1, ..., 310-N. For example, a first page of write data received from a host can be written to a first memory device, a second page to a second memory device, etc. In another example embodiment, a first fragment, e.g., a sector, of a first page of write data received from a host can be written to a first memory device, a second fragment of the first page to a second device, etc. Although data may be written in a stripe-based operation, data may still be read in a page-based operation.

A stripe reclamation operation can include a plurality of block erase operations, e.g., one block erase operation per each channel associated with the non-volatile memory control circuitry 322. In one or more embodiments, the plurality of block erase operations in the stripe reclamation operation can be performed substantially simultaneously across the plurality of channels. A block erase command can be executed on one or more solid state memory devices 310-1, ..., 310-N. Additional detail on stripe-based operation is provided herein.

Figure 4:
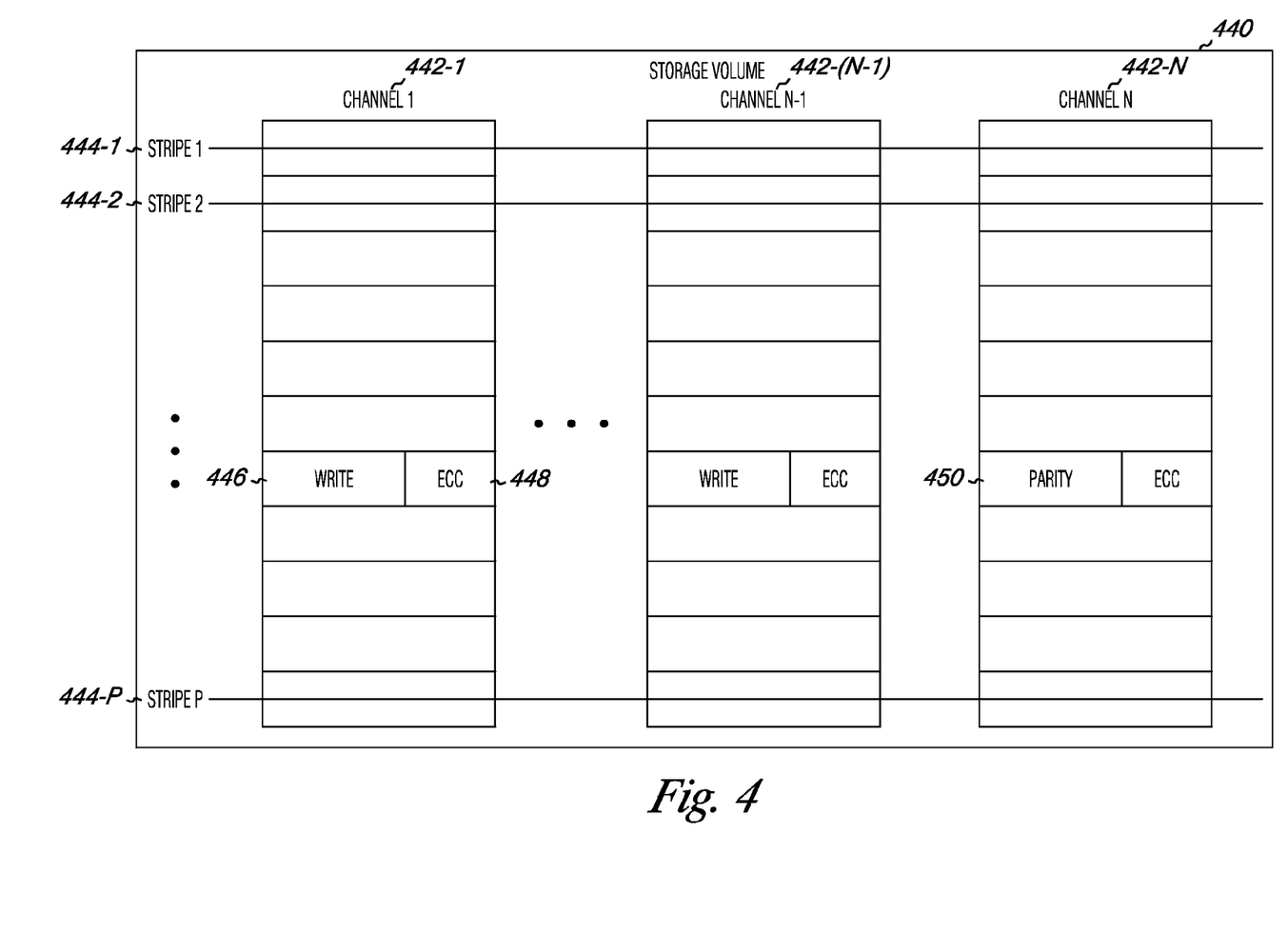
FIG. 4 illustrates a block diagram of a storage volume operated on a stripe-basis in accordance with one or more embodiments of the present disclosure.

FIG. 4 illustrates a block diagram of a storage volume 440 operated on a stripe-basis in accordance with one or more embodiments of the present disclosure. The storage volume 440 can be provided by a file system formatted to a number of solid sate memory devices, e.g., solid state memory devices 110-1, ..., 110-N in FIG. 1, in a memory system, e.g., memory system 104 in FIG. 1. As described herein, each solid state memory device can be associated with a memory channel 442-1, ..., 442-(N−1), 442-N. Data can be written in a number of stripes 444-1, 444-2, ..., 444-P across the storage volume 440 provided by the number of solid state memory devices.

A memory system can receive write data from a host system. The memory system, e.g., RAID XOR circuitry 226 associated with host-memory translation circuitry 216 in FIG. 2, can calculate parity data for the write data. In one or more embodiments, the write data and parity data can be striped across the storage volume 440 such that write data is written across a subset of the number of available channels, e.g., channels 442-1, ..., 442-(N−1) and parity data can be written across a second subset of the number of available channels, e.g., channel 442-N. For example, a memory system can include eight channels where seven channels are used for writing write data and one channel is used for writing parity data, however embodiments are not so limited. However, embodiments are not limited to using N−1 of N channels for write data and a single channel for parity data. According to one or more embodiments of the present disclosure, RAID structure and/or stripe size can be programmable options.

A RAID structure can represent an implementation of a RAID storage scheme devised to divide and/or replicate data across multiple memory devices. For example, data can be striped and/or mirrored across two or more devices. Again, striping can include dividing write data into fragments and storing at least one fragment in each of a number of memory devices. Mirroring can include redundantly storing a copy of write data in at least two memory devices. Both striping and mirroring can include the use of first level and/or second level error detection/correction. Parity data can be stored in the same memory devices as write data and/or in a separate device from the devices storing write data. According to one or more embodiments of the present disclosure, the particular RAID structure to be implemented by a memory system can be a programmable option.

As used herein, a stripe size can refer to the number of memory devices across which data is striped. According to one or more embodiments of the present disclosure, a stripe size for a memory system can be a programmable option such that any number of the memory devices available to the memory system can be used for a stripe. For example, a memory system including 32 channels and 32 corresponding memory devices can have any stripe size from 2-32 memory devices. Furthermore, a stripe size can change during operation of the memory system as described herein, e.g., in response to an effectively removed portion of the memory stripe. As described herein, a block table can be used to keep track of which portions of the memory system constitute which stripes.

Storing parity data can allow data associated with an effectively removed portion of a memory stripe to be recreated, e.g., a portion that experiences a UECC error. A memory channel, a memory device, a block of memory, a page of memory, or another portion of a memory device could experience an uncorrectable error or other error. For example, write data can be written in the first stripe 444-1 across channels 442-1, ..., 442-(N−1). Parity data can be written in the first stripe 444-1 across channel 442-N. If the first channel 442-1 experiences an uncorrectable error or other error, write data associated with channels up to 442-(N−1) and parity data associated with channel 442-N can be used to recreate the data written across the first channel 442-1. Similar to the case of creating the parity data, the memory system, e.g., RAID XOR circuitry 226 in FIG. 2, can use parity data along with write data to calculate replacement data for data associated with a portion of the memory system that experiences an uncorrectable error or other error.

The ECC circuitry 232 associated with the non-volatile memory control circuitry 222 in FIG. 2, can calculate error correction data 448 for fragments of the write data 446 and/or the parity data 450 to be stored in the memory devices. FIG. 4 includes an illustration of write data 446 and error correction data 448 being stored in association with channels 442-1, ..., 442-(N−1) and parity data 450 and error correction data 448 being stored in association with channel 442-N. When a stripe is written, both write data and error correction data can be written together. If an error is detected in data, whether write data or parity data, error correction data can be used in attempt to correct the error in a first level of error correction before and/or without implementing a second level of error correction, e.g., the correction associated with parity data described above. A memory system may store sufficient error correction data to enable a threshold number of erroneous bits to be corrected. If an error is detected, e.g., a UECC error during a read operation, that includes more bit errors than are correctable with the error correction data, then the second level of error correction, e.g., using the parity data described above, may be implemented, e.g., the data associated with the error(s) may be recreated using parity data and a remainder of the write data.

Data can be written in a first stripe 444-1. Writing data in a stripe can include splitting write data into a number of fragments, e.g., pages, sectors, etc., and writing the fragments to memory devices associated with each channel 442-1, ..., 442-(N−1), 442-N. One or more embodiments can include writing at least one fragment to each of the plurality of memory devices, e.g., to each channel 442-1, ..., 442-(N−1), 442-N. In some embodiments that include writing parity data along with the write data, at least one fragment of write data can be written to one or more memory devices associated with a first subset of the channels, e.g., channels 442-1, . . . , 442-(N−1), and parity data can be written to one or more memory devices associated with a second subset of the channels, e.g., channel 442-N.

A memory system can receive a write command, write data, and a number of LBAs associated with the write data. Write data associated with the number of LBAs can be written in a first stripe 444-1. Subsequently, the memory system can receive a write command and updated write data associated with a particular one or more of the LBAs associated with the data written in the first stripe 444-1, e.g., an LBA that is the same as at least one LBA associated with data written in the first stripe 444-1. In some instances, the subsequent write command may be accompanied by unrelated data, e.g., data associated with LBAs for which associated data was not written in the first stripe 444-1, in addition to the updated data. In some instances, the subsequent write command including updated data can be combined with another subsequent write command that includes unrelated data.

In one or more embodiments, a portion of the first stripe 444-1 can be updated by writing updated data in a portion of second stripe 444-2 that is written across the storage volume 440. The memory system can write the updated data, and concurrently write other unrelated data, in a second stripe 444-2. Writing updated data and unrelated data in the second stripe 444-2 increases a utilization of the storage volume of the second stripe 444-2 as compared to writing updated data alone in the second stripe 444-2. "Unrelated data" means data not associated with LBAs for which associated data was written in the first stripe. In association with writing the second stripe 444-2, the memory system can update an LBA table, e.g., LBA table 234 in FIG. 2, with the location of the updated data for the particular LBA. The memory system can update a block table, e.g., block table 236 in FIG. 2, to indicate that the portion of the first stripe 444-1 associated with the data that was updated is now invalid.

According to some previous approaches to updating a fragment of data stored in a first stripe, the entire stripe of data would be read, the fragment would be updated, e.g., modified, and the stripe (including the updated data and a remainder of the data from the first stripe) would be written either in the same first stripe or in a second stripe. However, according to one or more embodiments of the present disclosure, a fragment of data in a first stripe can be updated without reading or copying the first stripe. Such embodiments can improve device performance over some previous approaches by allowing updating write operations that do not include reading or copying operations, e.g., small random write performance can be improved.

Both the invalid portion of the first stripe 444-1 and a remainder of the first stripe 444-1 can be maintained until the first stripe 444-1 is reclaimed. Maintaining the invalid portion of the first stripe 444-1 can include preventing erasing of the invalid portion of the first stripe 444-1 even if the invalid portion of the first stripe 444-1 is in a different erase block than the remainder of the first stripe 444-1. Maintaining the remainder of the first stripe 444-1 can include reading at least a portion of the remainder of the first stripe 444-1. In some embodiments, a portion of non-updated data can be read without reading a remainder of the non-updated data. Maintaining the remainder of the firsts stripe 444-1 can include preventing erasing of the remainder of the first stripe 444-1. That is, the remainder of the first stripe 444-1 can continue to operate as though the invalid portion of the first stripe had not been updated.

The first stripe 444-1 can be maintained as described herein to facilitate error correction including the use of parity data as described above. That is, subsequent to invalidating the portion of the first stripe 444-1, a UECC error may occur in a valid portion of the first stripe 444-1. Because the parity data stored in the first stripe was calculated based on the non-updated (referred to herein as "original") write data in the first stripe 444-1, non-updated write data would be used to calculate replacement data for the valid portion of the first stripe 444-1 having a UECC error. Replacement data calculated in response to a UECC error can be written to a third stripe, e.g., stripe 444-P, without writing a remainder of the data from the first stripe 444-1. In some embodiments, replacement data can be written to the third stripe concurrently with data unrelated to data in the first stripe 444-1 and/or the second stripe 444-2. According to one or more embodiments of the present disclosure, invalid data can be maintained in a stripe after the invalid data has been updated with valid data in a different stripe. Such embodiments can reduce an amount of operating overhead with respect to some previous approaches that include reading and copying an entire stripe when updating a portion of the stripe.

The first stripe 444-1 can be reclaimed, e.g., erased and made available for future write operations. Reclaiming the first stripe 444-1 can include copying the remainder, e.g., valid portions, of the first stripe 444-1 to a third stripe, e.g., stripe 444-P, in response to, for example, a wear leveling operation as described herein. For example, the first stripe 444-1 can be reclaimed when all portions of the first stripe 444-1 are invalid, e.g., have been updated in other stripes. Copying valid portions of the first stripe 444-1 to the third stripe can include concurrently writing the data from the valid portions and other unrelated data in the third stripe. Reclaiming the first stripe can include erasing portions of the stolid state memory devices associated with the first stripe. One or more embodiments of the present disclosure can include reclaiming portions of a memory system on a stripe-basis rather than a block-basis as may occur according to some previous approaches. Stripe-based reclamation can further provide for an ability to maintain invalid data in a stripe for potential use with later UECC correction with parity data, valid data, and invalid data.

One or more embodiments of the present disclosure can include detecting an error associated with a portion of a first stripe 444-1, effectively removing, e.g., invalidating, the portion of the first stripe 444-1 from the first stripe 444-1, and operating the first stripe 444-1 without the removed portion. For example, a UECC error may be associated with a particular channel, e.g., channel 442-(N−1). Data written across channel 442-(N−1) can be recreated by calculating replacement data using write data and parity data (and error correction data when applicable) from a remainder of the channels associated with the first stripe 444-1. The replacement data can be written to a second stripe 444-2, e.g., without writing a remainder of the data from the first stripe 444-1. Subsequently, the first stripe 444-1 can be operated without the use of the removed channel 442-(N−1). For example, a subsequent write operation in the first stripe 444-1 can include calculating parity data based on data associated with channels other than the removed channel 442-(N−1), e.g., one fewer bit per parity bit.

A block table, e.g., block table 236 in FIG. 2, can be provided with an indication that the removed portion of the first stripe 444-1, e.g., channel 442-(N−1) is effectively removed. Operating the first stripe 444-1 without the removed channel 442-(N−1) can include, after the first stripe 444-1 is reclaimed, writing data and parity data in the first stripe 444-1 across the storage volume 440 provided by a number of memory devices without writing data and/or parity data to the removed channel 442-(N−1). The removed portion need not be a channel. The removed portion can be a memory device, a die, a block, a page, or some other portion of a memory system.

Figure 5:
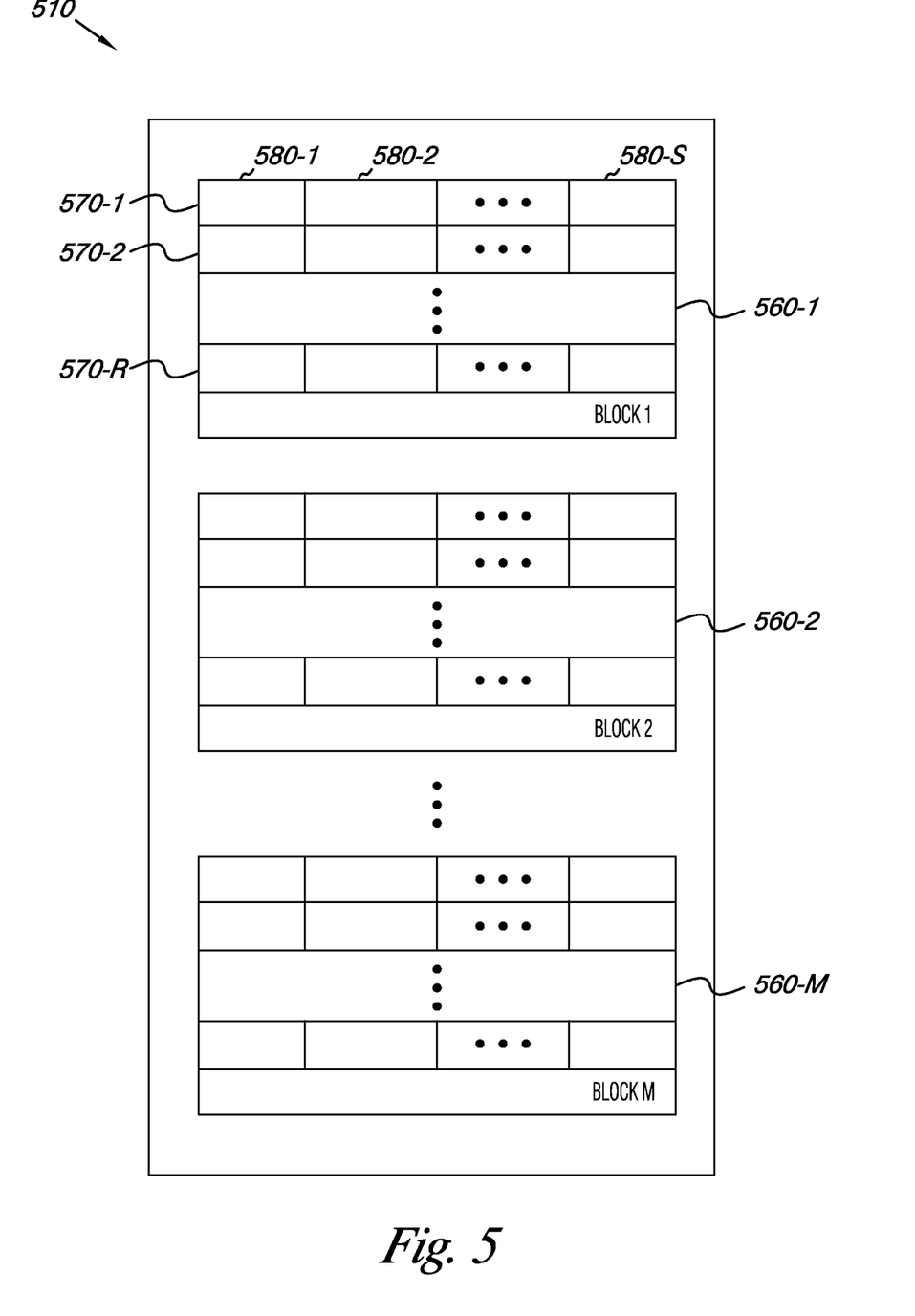
FIG. 5 illustrates a diagram of a portion of a memory device in accordance with one or more embodiments of the present disclosure.

FIG. 5 illustrates a diagram of a portion of a memory device 510 in accordance with one or more embodiments of the present disclosure. Although not shown in FIG. 5, one of ordinary skill in the art will appreciate that the memory device 510 can be located on a semiconductor die along with various peripheral circuitry associated with the operation thereof. Memory device 510 can include one or more arrays of memory cells.

As shown in FIG. 5, memory device 510 can include a number of physical blocks 560-1 (BLOCK 1), 560-2 (BLOCK 2), . . . , 560-M (BLOCK M) of memory cells. In the example shown in FIG. 5, the indicator "M" is used to indicate that the memory device 510 can include a number of physical blocks. As an example, the number of physical blocks in memory device 510 may be 128 blocks, 4,096 blocks, or 32,768 blocks, however embodiments are not limited to a particular number or multiple of physical blocks in a memory device. Further, embodiments are not limited to the type of memory used in the array, e.g., non-volatile, volatile, etc. In the embodiment illustrated in FIG. 5, the memory device 510 can be, for example, a NAND flash memory device 510 such that, for example, the memory cells in each physical block 560-1, 560-2, . . . , 560-M can be erased together as a unit, e.g., the cells in each physical block can be erased in a substantially simultaneous manner. For instance, the cells in each physical block can be erased together in a single erasing operation.

Although not specifically designated as such in FIG. 5, a number of blocks can be designated as spare blocks to reduce the amount of write amplification associated with writing data in the solid state memory devices, e.g., solid state memory devices 110-1, . . . , 110-N in FIG. 1. A spare block can be a block in a memory array that can be designated as a block where data cannot be written. Write amplification can be reduced by increasing the amount of space on a memory array that is designated as free space (i.e., where static data will not be written), thus allowing for less amplification of the amount of data that has to be written because less data will have to be rearranged. Furthermore, spare blocks can be used as replacement blocks for blocks that experience uncorrectable errors or other errors during operation of the memory system. For example, a memory system can be configured such that a particular number of blocks are reserved as spares per channel. If a particular block in a channel that is being operated as a portion of a stripe experiences an uncorrectable error or other errors, one of the spare blocks from that channel can be used to replace the particular block so that the stripe can continue to be the same size, e.g., include the same number of channels and/or memory devices. A block table can be updated such that an address associated with the particular block is updated with an address of the replacement block to allow the stripe to continue to operate at the same size.

The indicator "R" is used to indicate that a physical block, e.g., 560-1, 560-2, . . . , 560-M, can include a number of rows. In some embodiments, the number of rows, e.g., word lines, in each physical block can be 32, but embodiments are not limited to a particular number of rows 570-1, 570-2, . . . , 570-R per physical block. As one of ordinary skill in the art will appreciate, each row 570-1, 570-2, . . . , 570-R can include one or more physical pages, e.g., an even page and an odd page. A physical page refers to a unit of writing and/or reading, e.g., a number of cells that are written and/or read together or as a functional group of memory cells. Accordingly, an even page and an odd page can be written and/or read with separate writing and/or reading operations. For embodiments including multilevel cells (MLC), a physical page can be logically divided into an upper page and a lower page of data. For example, one memory cell can contribute one or more bits to an upper page of data and one or more bits to a lower page of data. Accordingly, an upper page and a lower page of data can be written and/or read as part of one writing and/or reading operation, as the logical upper page and logical lower page are both part of the same physical page. For ease of illustration, each row 570-1, 570-2, . . . , 570-R, in FIG. 5 includes only one physical and logical page, however embodiments are not so limited.

In one or more embodiments of the present disclosure, and as shown in FIG. 5, a page can store data in a number of sectors 580-1, 580-2, . . . , 580-S. The indicator "S" is used to indicate that a page can include a number of sectors. Each sector 580-1, 580-2, . . . , 580-S can store system and/or user data and can include overhead information, such as error correction code (ECC) information, and logical block address (LBA) information. As one of ordinary skill in the art will appreciate, logical block addressing is a scheme that can be used by a host for identifying a sector of information, e.g., each sector can correspond to a unique LBA. In one or more embodiments, a sector is the smallest addressable portion of a storage volume. As an example, a sector of data can be a number of bytes of data, e.g., 256 bytes, 512 bytes, or 1,024 bytes. For example, an SSD can have 4, 8, or 16 sectors in a page, where a sector can be 512 bytes, and an SSD can have 128, 256, or 512 pages per physical block, therefore physical block sizes are 131072 bytes, 262144 bytes, and 524288 bytes. Embodiments are not limited to these examples.

It is noted that other configurations for the physical blocks 560-1, 560-2, . . . , 560-M, rows 570-1, 570-2, . . . , 570-R, sectors 580-1, 580-2, . . . , 580-S, and pages are possible. For example, the rows 570-1, 570-2, . . . , 570-R of the physical blocks 560-1, 560-2, . . . , 560-M can each store data corresponding to a single sector which can include, for example, more or less than 512 bytes of data.

Conclusion

The present disclosure includes methods and devices for stripe-based memory operation. One method embodiment includes writing data in a first stripe across a storage volume of a plurality of memory devices. A portion of the first stripe is updated by writing updated data in a portion of a second stripe across the storage volume of the plurality of memory devices. The portion of the first stripe is invalidated. The invalid portion of the first stripe and a remainder of the first stripe are maintained until the first stripe is reclaimed.

It will be understood that when an element is referred to as being "on," "connected to" or "coupled with" another element, it can be directly on, connected, or coupled with the other element or intervening elements may be present. In contrast, when an element is referred to as being "directly on," "directly connected to" or "directly coupled with" another element, there are no intervening elements or layers present. As used herein, the term "and/or" includes any and all combinations of one or more of the associated listed items.

As used herein, the term "and/or" includes any and all combinations of one or more of the associated listed items. As used herein the term "or," unless otherwise noted, means logically inclusive or. That is, "A or B" can include (only A), (only B), or (both A and B). In other words, "A or B" can mean "A and/or B" or "one or more of A and B."

It will be understood that, although the terms first, second, third, etc. may be used herein to describe various elements, these elements should not be limited by these terms. These terms are only used to distinguish one element from another element. Thus, a first element could be termed a second element without departing from the teachings of the present disclosure.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and methods are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A device, comprising:
    memory control circuitry configured to:
        write data in a first stripe having a particular stripe size and being across a storage volume of a plurality of memory devices;
        update a portion of the first stripe including:
            write updated data in a portion of a second stripe, the second stripe having the particular stripe size and being across the storage volume of the plurality of memory devices; and
            invalidate the portion of the first stripe; and
            maintain the invalid portion of the first stripe and a remainder of the first stripe until the first stripe is reclaimed.

2. The device of claim 1, wherein the memory control circuitry is configured to split write data into a number of fragments and write the number of fragments to the plurality of memory devices by at least one of the group including:
    writing at least one fragment to each of the plurality of memory devices; and
    writing at least one fragment to each of a subset of the plurality of memory devices.

3. The device of claim 1, wherein the memory control circuitry is configured to update the portion of the first stripe by writing updated data in the portion of the second stripe without reading or copying the data written in the first stripe.

4. The device of claim 1, wherein the memory control circuitry is configured to maintain the first stripe by at least one of the group including:
    preventing erasing of the first stripe; and
    reading at least a portion of the remainder of the first stripe.

5. The device of claim 1, wherein the memory control circuitry is further configured to reclaim the first stripe, wherein reclaiming the first stripe includes:
    copying the remainder of the first stripe to a third stripe in response to a wear leveling operation; and
    erasing the first stripe.

6. The device of claim 1, wherein the memory control circuitry is further configured to read the portion of the second stripe on a page basis without reading the remainder of the first stripe or another portion of the second stripe.

7. A method, comprising:
    writing original data in a first stripe across a storage volume of a plurality of memory devices;
    updating at least a fragment of the written original data, wherein updating includes writing updated data in a second stripe without reading or copying the written original data;
    calculating respective first level error correction data based on each fragment of the original data;
    calculating second level error correction data based on the original data;
    wherein writing the original data includes writing the original data and the first level error correction data in a first subset of the plurality of memory devices, and writing the second level error correction data in a second subset of the plurality of memory devices;
    detecting an error in a fragment of original data in the first stripe, wherein the error is uncorrectable with the first level error correction data; and
    correcting the error, wherein correcting the error includes:
        creating replacement data for the fragment of original data based on at least a remainder of the original data and the second level error correction data in the first stripe;
    writing the replacement data in a third stripe without writing the remainder of the original data in the third stripe; and
    writing unrelated data in the third stripe concurrent with writing the replacement data in the third stripe, wherein the unrelated data is unrelated to the original data in the first stripe or the replacement data in the third stripe.

8. The method of claim 7, wherein the method includes reading a fragment of non-updated original data without reading a remainder of the original data.

9. The method of claim 7, wherein the second level error correction data comprises parity data.

10. The method of claim 7, wherein:
    writing original data includes writing original data associated with a number of logical block addresses (LBAs); and
    updating at least the fragment of the original data includes writing updated data associated with at least one of the number of LBAs.

11. A device, comprising:
    memory control circuitry configured to:
        write data in a stripe across a storage volume provided by a plurality of solid state memory devices across a plurality of channels;

read data from a portion of the stripe across one of the plurality of channels; and reclaim portions of the storage volume on a stripe-basis in response to one or more of the group including:
- all portions of the particular stripe having an invalid indication in a block table; and
- a garbage collection threshold amount of portions of the particular stripe having an invalid indication in the block table, wherein the threshold amount of portions is greater than one and less than all portions.

12. The device of claim 11, wherein the memory control circuitry is configured to:
- maintain the block table with information regarding validity of portions of the stripe;
- indicate that a portion of the stripe is invalid in the block table in response to updated data corresponding to the portion of the stripe being written to another stripe; and
- operate the stripe without the invalid portion.

13. The device of claim 11, wherein the memory control circuitry comprises discrete channel memory control circuitry for each of the plurality of channels.

14. The device of claim 11, wherein the memory control circuitry comprises an application specific integrated circuit (ASIC).

15. The device of claim 11, wherein the stripe comprises portions of the plurality of solid state memory devices that store the data written in the stripe.

16. A method, comprising:
writing data in a stripe across a storage volume provided by a plurality of solid state memory devices across a plurality of channels;

reading data from a portion of the stripe across one of the plurality of channels; and reclaiming portions of the storage volume on a stripe-basis in response to one or more of the group including:
- all portions of the particular stripe having an invalid indication in a block table; and
- a garbage collection threshold amount of portions of the particular stripe having an invalid indication in the block table, wherein the threshold amount of portions is greater than one and less than all portions.

17. The method of claim 16, wherein the method includes:
- maintaining the block table with information regarding validity of portions of the stripe;
- indicating that a portion of the stripe is invalid in the block table in response to updated data corresponding to the portion of the stripe being written to another stripe; and
- operating the stripe without the invalid portion.

18. The method of claim 16, wherein the method includes storing the block table in volatile memory.

19. The method of claim 18, wherein the method includes storing a copy of the block table in at least one of the plurality of solid state memory devices.

20. The method of claim 16, wherein the stripe comprises portions of the plurality of solid state memory devices that store the data written in the stripe.

* * * * *